United States Patent [19]

Laue

[11] Patent Number: 4,748,398

[45] Date of Patent: May 31, 1988

[54] CIRCUIT FOR CONTROLLING A SERIES SWITCHING ELEMENT IN A CLOCKED POWER SUPPLY

[75] Inventor: Hans-Bodo Laue, Altenbeken, Fed. Rep. of Germany

[73] Assignee: Nixdorf Computer AG, Paderborn, Fed. Rep. of Germany

[21] Appl. No.: 13,834

[22] Filed: Feb. 12, 1987

[30] Foreign Application Priority Data

Feb. 14, 1986 [DE] Fed. Rep. of Germany ....... 3604716

[51] Int. Cl.$^4$ .............................................. G05F 1/44
[52] U.S. Cl. ................................... 323/285; 323/284; 323/351
[58] Field of Search ............... 323/282, 284, 285, 288, 323/349, 351, 901

[56] References Cited

U.S. PATENT DOCUMENTS

| | | | |
|---|---|---|---|
| 4,553,082 | 11/1985 | Nesler | 323/288 |
| 4,578,630 | 3/1986 | Grosch | 323/284 X |
| 4,607,320 | 8/1986 | Matui et al. | 323/288 X |
| 4,642,550 | 2/1987 | Illuzzi et al. | 323/285 X |

Primary Examiner—R. M. Skudy
Assistant Examiner—Marc S. Hoff
Attorney, Agent, or Firm—Cullen, Sloman, Cantor, Grauer, Scott & Rutherford

[57] ABSTRACT

A circuit arrangement for the control of the series switching element of a clocked power supply unit has a pulse signal (Vt) delivered by a pulse generator. The pulse-interval ratio of the pulse signal can be varied as a function of a regulating signal (Vc) derived from the output side of the power supply unit and delivered by way of an optoisolator (13). The portion of the circuit employed as pulse generator (1) includes an operational amplifier (10) with feedback at both inputs. One feedback branch of the amplifier (10) contains at the amplifier input a capacitance (15) and a variable resistance. The variable resistance is formed by the parallel connection of a phototransistor (132) of an optoisolator (13) and an ohmic resistor (12). Accordingly, it becomes possible to produce a variation of the pulse-interval ratio of the pulse signal (Vt) either solely by modification of the pulse length or solely by modification of the pulse intervals. One input of the operational amplifier (10) may be connected with a start-stop switching stage (3), which also uses an op-amp (20). The two operational amplifiers (10, 20), which both are employed as open collector voltage comparators, can also be made as part of an integrated unit.

18 Claims, 1 Drawing Sheet

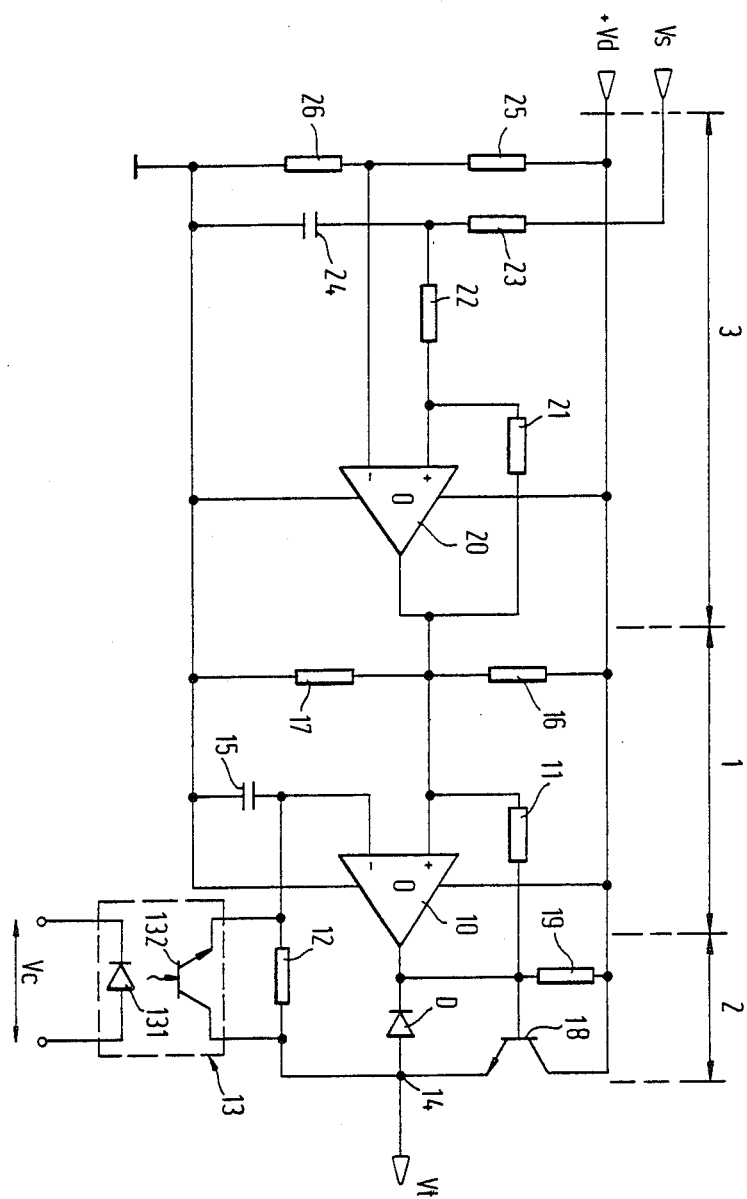

CIRCUIT FOR CONTROLLING A SERIES SWITCHING ELEMENT IN A CLOCKED POWER SUPPLY

TECHNICAL FIELD

The present invention relates in general to control circuits for clocked power supply units, and in particular to circuits for controlling the series switching element of clocked power supply units so as to achieve excellent power supply regulation.

BACKGROUND

The control of the series switching element of a clocked power supply unit is obtained by means of control pulses whose pulse-interval ratio is intended to lead to the most constant possible d.c. voltage delivered on the output side of the power supply unit. Towards such end, a regulating signal corresponding to the output voltage is derived and forwarded to a pulse length modulator in order to regulate the pulse-interval ratio of the control pulses in such a manner that the output d.c. voltage remains largely constant, independent of changes in load. Accordingly, electrical isolation of the regulation signal is required in order to ensure voltage isolation between the output circuit and the control circuit. In clocked power supply units optoisolators are employed to achieve such isolation because they facilitate the electrically separate transmission of d.c. voltage signals. A circuit arrangement operating a clocked power supply having a series switching element according to the principle described above is disclosed in German Democratic Republic Pat. No. 223,586. This prior circuit arrangement does not require a separate pulse-length modulator to modify the pulse-interval ratio of the control pulses because it is designed essentially as a Schmitt trigger circuit which is influenced directly by the regulating signal. In special operating cases, however, such as in starting and stopping of the power supply unit, additional control functions must be made available which ensure, for example, "soft" starting or slow discharge of the input capacitance of the power supply unit, which correspondingly influence the regulating circuit by their retroactions (i.e., reactions). This, however, renders the design of control circuits of the aforementioned kind rather complex.

In clocked power supply units, the circuit controlling the longitudinal logic element is predominantly capacitively loaded and in the interest of the highest possible limit frequency and lowest possible power input, should not delay, if possible, the charge processes of the capacitive load.

SUMMARY OF THE INVENTION

It is the object of the present invention to provide a circuit for the control of the series switching element of clocked power supply units, which while offering the greatest possible simplicity, ensures a reliable and reaction-free control. Another object of the present invention is to provide a circuit of the foregoing type that is particularly suitable for use in equipment or appliances wherein the circuit or series switching is predominantly capacitively charged.

The foregoing objects are achieved by a preferred embodiment of the present invention which provides an improved circuit for controlling a longitudinal series switching of a clocked power supply unit by producing a pulse signal whose pulse-interval ratio can be varied as a function of a regulating signal derived from the output side of said power supply unit and conducted over an optoisolator having a phototransistor. The circuit is of the type which includes a feedback oscillator circuit having a first feedback branch provided with a capacitance and with a variable resistance comprised of a parallel connection of the phototransistor and a resistor. The improvement in the circuit comprises in combination: the oscillator circuit having an operational amplifier provided with an output and said first feedback branch and a second feedback branch, an amplifying transistor provided with an emitter, and a diode. In the improved circuit of the present invention, the amplifying transistor is connected to the output of the operational amplifier and is arranged to operate in an emitter-follower mode, the diode is poled in the reverse direction relative to the output of the operational amplifier, the first feedbck branch is connected to the emitter of the amplifying transistor, and the second feedback branch is connected to the output of the operational amplifier. In the improved circuit, the phototransistor of the optoisolator preferably has a distinctive cut-off characteristic in its inverse operation, as will be described more fully below. Also, the amplifier is preferably arranged as a voltage comparator. Other advantageous further refinements are described and claimed below.

By means of the foregoing invention, there is achieved a power amplification whereby a capacitive load, downstream from the power amplifier in series, during the pulse intervals in which the amplifying transistor is blocked, can be discharged practically without any delay via the diode and the output of the oscillator circuit, such that the cut-off frequency of the oscillator circuit at capacitive load is not impaired. The two feedback branches differ by their starting point. The feedback branch having the optoisolator leads from the circuit output to the input of the operational amplifier, whereas the other feedback branch is connected directly with the output of the operational amplifier. As a result of this measure or feature, the interferences which, e.g., due to decay processes, may be superimposed over the output voltage of the oscillator circuit, do not exert any retroaction on the oscillator circuit proper since they are kept away from the output thereof by the downstream operational amplifier. Otherwise, such retroactions could interfere with the stable operation of the oscillator circuit in that they would become effective at an input of the operational amplifier by way of the aforementioned feedback branch. It is true that the other feedback branch which contains the optoisolator is connected with the output of the power amplifier. However, the interferences possibly superimposed over the output voltage cannot become effective at the other input of the operational amplifier since they are filtered out by the ohmic resistance and capacitance of this feedback branch, which are connected there as RC element.

Optoisolators with phototransistors are available and they have a distinctive cut-off property in inverse operation. This means that if they are applied in connection with the invention, a clean separation of the charge and discharge process of the capacitance joined with the first feedback branch is possible. In the following, a description will be given of how this can be achieved by regulating the pulse lengths or pulse intervals of the output signal of the oscillator circuit, while at the same time excluding any effect on each of the other factors, i.e., pulse interval and pulse length, respectively.

It is advantageous to use an operational amplifier as a voltage comparator. In comparision to the conventional operational amplifiers, such a comparator offers the advantage of a more favorable switching capacity input as the operating frequency increases, i.e., greater efficiency, in particular at high frequency.

In principle, the connection and disconnection of the oscillator circuit becomes possible since one of the two inputs of the operational amplifier is optionally connected with the reference potential. It a further refinement of the present invention, this result may be advantageously obtained since one input of the operational amplifier is connected with an open collector output of a start-stop switching stage. In this situation, the switching stage has the task to connect or not to connect, the input of the operational amplifier connected with it to the reference potential, as a function of a switching command. This characteristic is ideally achieved by the open collector output of the switching stage.

An especially simple implementation of the latter principle is obtained when the start-stop switching stage is provided with a second voltage comparator with two inputs, one of which receives a reference voltage and the other one of which is supplied with a start-stop voltage signal. The use of the second voltage comparator offers a special advantage in that the first and second voltage comparators may be constructed as one integrated circuit unit, so that both comparators are in a common housing, and are presented as a unitary module containing an oscillator circuit with a start-stop switching stage. The start-stop voltage signal of the second voltage comparator can actuate or cut off the oscillator circuit as a function of its amplitude since the second voltage comparator delivers its output signal depending on whether the voltage of the signal at its comparison input is larger or smaller than the reference voltage. The output signal of the voltage comparator is then accordingly produced by the open collector output of the voltage comparator so as to be in either its conducting state or open state.

The start-stop voltage signal is advantageously delivered by way of an RC delay element. When the start-stop signal is delivered in this manner, the oscillator circuit is started only after a predetermined time delay. This is of importance, e.g., in the case where the oscillator circuit is utilized in clocked power supply units which are to start "softly," i.e., a start-up wherein the input capacitor of the power supply unit is allowed to charge to such a high voltage value prior to connecting the oscillator circuit that the capacitor voltage, as a result of the power consumption from the capacitor, can no longer drop below the cut-off point of the start-stop switching stage.

The second voltage comparator can be provided with a regenerative feedback towards the comparison input, if desired, in order to obtain a switching hysteresis.

In the following description, the improved circuit of the present invention will be further explained with reference to an exemplary embodiment illustrated in the FIGURE.

DETAILED DESCRIPTION

The circuit appearing in the FIGURE contains an oscillator circuit 1, a power amplifier 2 following thereafter, and a start-stop switching stage 3.

The oscillator circuit 1 contains a voltage comparator 10 having an inverting input and a non-inverting input and two feedback branches connected to such inputs. One of the feedback branches includes an ohmic resistance, resistor 11, connected between the non-inverting input and the output of the voltage comparator 10. The other feedback branch is formed by an ohmic resistance, resistor 12, and the collector-emitter path of an optoisolator 13. This second feedback branch leads from the output 14 of the circuit arrangement to the inverting input of the voltage comparator 10. The inverting input of voltage comparator 10 is also connected via a capacitor 15 to ground.

The non-inverting input of the voltage comparator 10 is connected to the tap of a voltage divider composed of resistors 16 and 17. The voltage divider, along with the remainder of the oscillator circuit 1, is connected to the positive operating voltage potential of the operating voltage Vd as well as to ground.

The voltage comparator 10 has an open collector output can be controlled with respect to ground potential or high-impedance, depending on the switching criteria at the inputs of the voltage comparator 10. The manner by which this circuit creates oscillation need not be explained in detail inasmuch as it does not directly form a part of the invention. The oscillator circuit 1 delivers at its output square pulses whose pulse-interval ratio can be modified by changes in an analog control voltage Vc. The analog control voltage Vc is applied to an input diode 131 of the optoisolator 13 in a manner which, as will be described below, causes a resistance change in the phototransistor 132 of the optoisolator 13.

The voltage comparator 10 is followed by the power amplifier 2 which includes an amplifying transistor 18 that is operated in an emitter-follower mode so that its emitter forms the circuit output 14. The circuit output 14 is connected via a diode D with the output of the voltage comparator 10 which, in turn, controls the base of the amplifying transistor 18. A resistor 19 is placed between the positive operating voltage potential Vd and the base of the amplifying transistor 18, and, respectively, the output of the voltage comparator 10.

The start-stop switching stage 3 is provided with a voltage comparator 20 having an open collector output which is coupled with regenerative feedback to the non-inverting input thereof via a resistor 21. A start-stop voltage signal Vs is delivered to the non-inverting input of voltage comparator 20 by way of a resistor 22. The start stop signal Vs is delayed by means of an RC element composed of a resistor 23 and a capacitor 24. The inverting input of the voltage comparator 20 receives a reference voltage which is formed by voltage division through two resistors 25 and 26 connected in series with the operating voltage Vd.

The operation of the circuit described above will now be discussed with reference to the drawing. The oscillator circuit 1 is assumed initially to have a stationary operating state, and the influence of the optoisolator 13 on the pulse-interval ratio of the output signal of the oscillator circuit 1 will now be explained.

The resistor 12 in one of the feedback branches of the voltage comparator 10 is one of the elements determining the operating frequency of the oscillator circuit 1. The resistor 12 is connected in parallel with the phototransistor 132 of the optoisolator 13, the input diode 131 of which receives the control voltage V. If the control voltage Vc has a value of zero, no current flows through the input diode 131 and the phototransistor 132 is cut off. In this state, the operating frequency of the oscillator circuit 1 is determined only by the resistors 11, 12, 16, 17 and 19 in conjunction with the capacitor 15, whereby the pulse-interval ratio is determined by the ratio of resistances 16 and 17 to each other, so that by means of the values of these two resistances, i.e., resistances 16 and 17, a basic setting of the pulse-interval ratio can be effected.

If now a control voltage Vc appears at the input diode 131 of the optoisolator 13 which has a polarity such that a current flows in the forward direction through the input diode 131, the phototransistor 132 of the optoisolator 13 is controlled so as to assume a conductance proportional to the control voltage Vc. Let it now be assumed that an optoisolator 13 is employed whose phototransistor 132 has distinctive cutoff properties in inverse operation. This will result in the phototransistor 132 becoming conductive only if its collector is positive relative to its emitter. On the other hand, i.e., in inverse operation, the phototransistor 132 is cut off even though a forwardly directed control voltage Vc may be applied to the input diode 131.

When the phototransistor 132 is conducting, the capacitor 15 at the inverting input of the voltage comparator 10 is charged by way of the parallel connection of the resistor 12 and the phototransistor 132. Whenever a signal appears at the output of the voltage comparator 10, it is amplified by the amplifying transistor 18 and a resulting signal is formed at the circuit output 14 which represents a hig state H. If, however, the signal at the circuit output 14 is in a low state L, the capacitor 15 is practically discharged only via the resistor 12 but not through the phototransistor 132 because the latter's internal resistance during inverse operation is large relative to that of the resistor 12.

The time during which a high state H is present at the circuit output 14 determines the pulse length of the pulse-shaped signal Vt delivered by the circuit, and it can be varied in accordance with the control voltage V. The duration of the low state L, i.e., the interval length of the pulse-shaped signal Vt, however, remains uninfluenced.

The diode D forms a discharge current path for a capacitive load connected at the circuit output 14 when the amplifying transistor 18 is cut off. The discharge of the capacitive load occurs via the diode D and the open collector output of the voltage comparator 10 when such output is connected to ground. In this manner, the emitter of the transistor 18 receives, relative to the base, a positive bias whose magnitude corresponds to the residual voltage on the diode D so that the transistor 18 cuts off reliably and rapidly.

It is also possible to control the pulse interval of the pulse-shaped output signal Vt instead of the pulse length thereof. Towards such end, the phototransistor 132 must be reversed in polarity so that its emitter, rather than its collector, is connected to the circuit output 14.

It should be mentioned here that the pulse length and interval length, respectively, of the pulse-shaped signal Vt is always controlled as a function of the control voltage Vc so that, for example, a current variation in the forward direction of the input diode 131 of the optoisolator 13 will result in an inversely proportional modification in time in the output signal Vt. Thus, as the size of the current increases, the pertinent controlled time becomes shorter.

The oscillator circuit with the downstream power amplifier is arranged differently with respect to the two feedback branches. The feedback resistor 11 is connected directly with the output of the voltage comparator 10 whereas the feedback resistor 12 is connected with the circuit output 14. The direction connection of the resistor 11 with the output of the voltage comparator 10 offers the advantage that interferences which are superimposed over the output signal Vt, which may result from operation of the circuit within a clocked power supply unit, are not transmitted to the corresponding input of the voltage comparator 10 on feedback to the circuit output 14 via the feedback resistor 11. Such interferences, in fact, could falsify the switching threshold of the voltage comparator 10 which is determined by the resistors 11, 16 and 17 at the non-inverting input of the voltage comparator 10.

The superimposed interferences on the inverting input of the voltage comparator 10 are filtered out by the RC element formed by the resistor 12 and the capacitor 15.

Like the resistor 11, the resistor 12 could be directly connected with the output of the voltage comparator 10, depending on the predetermined power input of the oscillator circuit.

It is the purpose of the second voltage comparator 20 to connect the non-inverting input of the voltage comparator 10, i.e., the active element of the oscillator circuit, with ground potential, if necessary. Such a connection interrupts the oscillatory state of the oscillator circuit so that the output signal Vt assumes a low state L. If the inverting input of the voltage comparator 10 were connected with ground potential, the oscillator state would be interrupted, too, but the output signal Vt would assume the high state H. In order to establish such a connection with ground potential, a switching transistor with a low saturation voltage could also be used. However, in the circuit represented in the drawing, the open collector output of the second voltage comparator 20 is employed which, together with the first voltage comparator 10, may be designed as an integrated circuit unit in a common housing to carry out the task described below.

The second voltage comparator 20 receives at its inverting input a reference voltage which is derived from the operating voltage Vd by means of the voltage divider made up of resistors 25 and 26. If at the non-inverting input of the voltage comparator 20 there appears a voltage which exceeds this reference voltage, the output of the voltage comparator 20 is "open." However, if the voltage at the non-inverting input is below the reference voltage at the inverting input of the voltage comparator 20, the open collector output of the voltage comparator 20 switches to a conducting state, thereby connecting the non-inverting input of the voltage comparator 10 with ground potential so that the oscillatory state of the oscillator circuit 1 is interrupted and the output 14 is in a low state L. The voltage at the non-inverting input of the voltage comparator 20 effecting the cutting-in and cutting-out of the oscillatory state is delivered as a controlling switching voltage Vs by way of resistor 22 after it has been delayed by the RC element containing the resistor 23 and the capacitor 24.

In the event that the oscillator voltage is to be changed from a stopped state to an oscillating state, the voltage comparator 20 must change correspondingly to the starting state. This means that the output of the voltage comparator 20 must be switched from a conducting state to an open state, and thus the switching voltage Vs must exceed the reference voltage at the inverting input of the voltage comparator 20. When this happens, the voltage comparator 20 changes to an open state, a positive voltage jump at the output of the voltage comparator 20 occurs as a result of the starting of the oscillatory state of the oscillator circuit, and, by way of the feedback resistor 11, a corresponding signal appears at the non-inverting input of the voltage comparator 10. A change in the switching threshold values determined by the resistors 11, 12 and, respectively, resistors 25, 26 at the non-inverting inputs of the voltage comparators 10 and 20 causes hysteresis of the start-stop switching of the overall circuit.

The delay effected, by means of the RC element containing the resistor 23 and the capacitor 24, in the switching process triggered by the switching signal Vs in the voltage comparator 20 fulfills a requirement that a clocked current supply unit employing the circuit shown in the drawing have a "soft" start.

The voltage comparator 20 can also be adapted such that the cutting-in of the oscillator circuit results from dropping-below and not the exceeding of the reference voltage. This mode of operation may be obtained, e.g., by interchange of the connections at the inputs of the voltage comparator 20.

I claim:

1. An improved circuit for controlling a series switching element of a clocked power supply unit by producing a pulse signal whose pulse-interval ratio can be varied as a function of a regulating signal derived from the output side of said power supply unit and conducted over an optoisolator having a phototransistor, said circuit being of the type including a feedback oscillator circuit having a first feedback branch provided with a capacitance and with a variable resistance comprised of a parallel connection of the phototransistor and a resistor, the improvement comprising in combination:

said oscillator circuit having an operational amplifier provided with an output and said first feedback branch and a second feedback branch, an amplifying transistor provided with an emitter, and a diode;

said amplifying transistor being connected to the output of said operational amplifier and being arranged to operate in an emitter-follower mode;

said diode being poled in the reverse direction relative to the output of said operational amplifier;

said first feedback branch being connected to the emitter of the amplifying transistor; and said second feedback branch being connected to the output of the operational amplifier.

2. A circuit as in claim 1, wherein the phototransistor of said optoisolator has a distinctive cut-off characteristic in its inverse operation.

3. A circuit as in claim 1, wherein said operational amplifier is arranged as a voltage comparator.

4. A circuit as in claim 2, wherein said operational amplifier is arranged as a voltage comparator.

5. A circuit as in claim 3, wherein the output of the operational amplifier is arranged to operate in open collector mode.

6. A circuit as in claim 4, wherein the output of the operational amplifier is arranged to operate in an open collector mode.

7. A circuit as in claim 1, wherein said operational amplifier has a plurality of inputs, and said circuit further comprises a start-stop switching stage having an open collector output, said open collector output being connected to one of the inputs of the operational amplifier.

8. A circuit as in claim 5, wherein said operational amplifier has a plurality of inputs, and said circuit further comprises a start-stop switching stage provided with an open collector output connected to one of the inputs of said operational amplifier.

9. A circuit as in claim 7, wherein said start-stop switching stage is provided with a voltage comparator having a plurality of inputs, said stage being arranged such that one of the inputs of said voltage comparator is adapted to receive a reference voltage, and another of the inputs of said voltage comparator functions as a comparison input and is adapted to receive a start-stop voltage signal.

10. A circuit as in claim 8, wherein said start-stop switching stage is provided with a voltage comparator having a plurality of inputs, said stage being arranged such that one of the inputs of said voltage comparator is adapted to receive a reference voltage, and another of the inputs of said voltage comparator functions as a comparison input and is adapted to receive a start-stop voltage.

11. A circuit as in claim 9, wherein the voltage comparator of the start-stop switching stage is an operational amplifier that includes said open collector output.

12. A circuit as in claim 10, wherein the voltage comparator of the start-stop switching stage is an operational amplifier that includes said open collector output.

13. A circuit as in claim 9, wherein said start-stop switching stage includes a resistor-capacitor delay element, and said start-stop voltage signal is delivered to said another input of said voltage comparator via said resistor-capacitor delay element.

14. A circuit as in claim 12, wherein said start-stop switching stage includes a resistor-capacitor delay element, and said start-stop voltage signal is delivered to said another input of said second voltage comparator via said resistor-capacitor delay element.

15. A circuit as in claim 9, wherein said voltage comparator of said start-stop switching stage is provided with a regenerative feedback path to the input functioning as a comparison input.

16. A circuit as in claim 11, wherein said voltage comparator of said start-stop switching stage is provided with a regenerative feedback path to the input functioning as a comparison input.

17. A circuit as in claim 9, wherein said two voltage comparators are arranged as a unified integrated circuit.

18. A circuit as in claim 11, wherein said two voltage comparators are arranged as a unified integrated circuit.

* * * * *